(12) United States Patent
Burchetta et al.

(10) Patent No.: US 6,850,918 B1
(45) Date of Patent: Feb. 1, 2005

(54) COMPUTERIZED DISPUTE RESOLUTION SYSTEM AND METHOD

(76) Inventors: James D. Burchetta, 210 Central Park South, New York, NY (US) 10019; Charles S. Brofman, 4 Five Ponds Dr., Waccabuc, NY (US) 10597

(*) Notice: Subject to any disclaimer, the term of this patent is extended or adjusted under 35 U.S.C. 154(b) by 0 days.

(21) Appl. No.: 09/450,938

(22) Filed: Nov. 29, 1999

Related U.S. Application Data (63) Continuation of application No. 09/130,154, filed on Aug. 6, 1998.

(51) Int. Cl.[7] .............................. G06F 17/60; H04L 9/00
(52) U.S. Cl. ....................................................... 705/80
(58) Field of Search ............................. 705/1, 4, 37, 80

(56) References Cited

U.S. PATENT DOCUMENTS

| | | | |
|---|---|---|---|
| 3,573,747 A | 4/1971 | Adams et al. | 705/37 |
| 3,581,072 A | 5/1971 | Nymeyer | 705/37 |
| 5,077,665 A | 12/1991 | Silverman et al. | 705/37 |
| 5,329,589 A | 7/1994 | Fraser et al. | 379/91.02 |
| 5,495,412 A | 2/1996 | Thiessen | 705/1 |
| 5,668,953 A | 9/1997 | Sloo | 705/1 |
| 5,689,652 A | 11/1997 | Lupien et al. | 705/37 |
| 5,794,207 A | 8/1998 | Walker et al. | 705/1 |
| 5,895,450 A * | 4/1999 | Sloo | 705/1 |
| 5,905,975 A | 5/1999 | Ausubel | 705/37 |
| 5,924,082 A | 7/1999 | Silverman et al. | 705/37 |
| 5,956,687 A | 9/1999 | Wamsley et al. | 705/1 |
| 5,983,205 A | 11/1999 | Brams et al. | 705/37 |
| 6,112,181 A | 8/2000 | Shear et al. | 705/1 |
| 6,112,189 A | 8/2000 | Rickard et al. | 705/37 |
| 6,131,087 A | 10/2000 | Luke et al. | 705/26 |
| 6,343,271 B1 * | 1/2002 | Peterson et al. | 705/4 |
| 2001/0039527 A1 * | 11/2001 | Ordish et al. | 705/37 |
| 2002/0091532 A1 * | 7/2002 | Viets et al. | 705/1 |

FOREIGN PATENT DOCUMENTS

| | | |
|---|---|---|
| WO | WO 97/04410 | 2/1997 |
| WO | WO 97/15362 | 5/1997 |

OTHER PUBLICATIONS

Anon., "Sybase Adds Web–based Technical Support to its Customer Service," Presswire, Mar. 29, 1996.*
Zeng, D.–Z. et al., "Double–offer Arbitration," mathematical social Sciences, vol. 31, No. 3, pp. 147–170, Jun. 1996.*
Mandell, J., "Cyberspace Conflicts?" Software Magazine, vol. 81, No. 4, p. 20, Mar. 1998.*
Abstract from New York Times editorial, Tuesday, Jan. 8, 1985.
Hines, Bernard L., "Arbitration spells relief. (insurance settlements)", Best's review—Property–Casualty Insurance Edition, vol. 86, p. 47(2), Jan. 1986.
Jackson, William, "Mediation proposed for securities disputes", Business First–Columbus, vol. 9, n31, p. 4(1), Apr. 5, 1993.
Skrzycki, Cindy, "Try Writing Rules in Cyberspace", The Washington Post, Financial Section, Feb. 8, 1994.
Stephenson, Max, "Rescuing ADR from its advances", Public Administration Review, vol. 55, No. 4, pp. 385–388, Jul./Aug. 1995.

(List continued on next page.)

Primary Examiner—Nicholas D. Rosen
(74) Attorney, Agent, or Firm—Greenberg Traurig LLP; Eugene C. Rzucidlo (57) ABSTRACT

An automated dispute resolution administration method involves checking an authorization for a request for access to an automated dispute resolution system made using a sponsor login area. A letter is automatically generated to a party to a dispute in response to a sponsor entering a case into an automated dispute resolution system. A person, adverse to the sponsor with respect to the case, is authorized to access the automated dispute resolution system. Tracking information is written onto a hard drive associated with at least one of the party or the sponsor; and a report is generated identifying open cases for the sponsor.

5 Claims, 4 Drawing Sheets

OTHER PUBLICATIONS

Grob, K., and Schecter, P.L., "Discovering Opportunities in Alternative Dispute Resolution: A Step–by–Step Guide for Getting Involved," *Outlook*, vol. 62, No. 4, p. 18, 1995.

Internet Business News, "Online Courtroom Service Introduced for U.S. Disputes", Jul. 1, 1996.

Robbins, Stuart, "Lowering the Cost of Doing Business through ADR," vol. 96, No. 11, pp. 58–59, Oct. 1997.

Mandell, Janette, "Cyberspace Conflicts", *Software Magazine*, vol. 18, No. 4, p. 20, Mar. 1998.

Negussie, Mel, "How to Select a Mediator," *Defense Counsel Journal*, vol. 65, No. 2, pp. 256–261, Apr. 1998.

Mullins, R., "Mediation, Arbitration Venues Offer Corporate Litigants Justice–in–Time," *Business Journal–Milwaukee*, vol. 9, No. 39, p. S6(2), Jul. 4, 1992.

Schweber, Claudine, "Your Telephone May Be a Party Line: Mediation by Telephone", *Mediation Quarterly*, vol. 7, No. 2, pp. 191–195, 1989.

Schneider Denenberg, Tia, "The Electronic Arbitrator", *The Arbitration Journal*, vol. 45, No. 1, pp. 48–52, Mar. 1990.

Arnold, Tom, "Patent Alternative Dispute Resolution Handbook", 1991.

Brams, Steven J. and Merrill III, Samuel, "Arbitration Procedures with the Possibility of Compromise", Controls and Cybernetics, vol. 21, No. 1, pp. 132–149, 1991.

Thiessen, Ernest and Loucks, Daniel, "Computer Assisted Negotiation Of MultiObjective Water Resources Conflicts", *Water Resources Bulletin*, American Water Resources Association, vol. 25, No. 1, pp. 163–177, Feb. 1992.

Hill, Richard, "Will Cyberspace Use Cybercourts?", International Commercial Litigation, Issue 23, pp. 33–35, Oct. 1997.

Neal Yeend, Nancy, "Electronic Alternative Dispute Resolution System Design", *Mediation Quarterly*, vol. 11, No. 2, pp. 193–194, 1993.

Shaw, et al., "Using Alternative Dispute Resolution In The Federal Government", 1993.

Macduff, Ian, "Flames on the Wires: Mediating from an Electronic Cottage", *Negotiation Journal*, vol. 10, No. 1, pp. 5–15, Jan. 1994.

Helie, John, "Conflict and Conflict Resolution on Electronic Networks", pp. 1–6, Jun. 1994.

SchWeber, Claudine, "The Use of Technology in Conflict Resolution," paper presented at the European Conference on Peacemaking and Conflict Resolution, Oct. 1994, pp. 1–4, San Sebastian, Spain.

Brams, Steven and Taylor, Alan, "Fair Division: From cake–cutting to dispute resolution", Cambridge University Press, 1996.

Levin, Amanda, "Online Claim Settlement Services Hit The Net", The National Underwriter Company National Underwriter, Claims Services Review Section, pp. 3–6, Nov. 9, 1998.

\* cited by examiner

COMPUTERIZED DISPUTE RESOLUTION SYSTEM AND METHOD

CROSS REFERENCE TO RELATED APPLICATIONS

This application is a continuation of U.S. patent application Ser. No. 09/130,154 filed on Aug. 6, 1998.

FIELD OF THE INVENTION

This invention relates generally to administration of computerized systems and more particularly to administration of a computerized system for automated dispute resolution through a communications linkage for communicating and processing a series of demands to satisfy a claim made by or on behalf of a claimant or other person involved in a dispute with at least one other person, such as a defendant, his or her insurer, or other sponsor, and a series of offers to settle the claim by the other person. The invention also relates to administration of a system for the collection, processing, and dissemination of settlement data generated from the settlement through the operation of the dispute resolution system for use by sponsors and claimants in establishing the settlement value of future cases.

BACKGROUND OF INVENTION

At the present time, it is readily apparent that a better way to resolve disputes has long been needed. Courtroom trials, once thought to be the only way to resolve legal controversies, are very costly and the outcome can be unsatisfactory for all concerned parties. The resulting disappointment with traditional litigation drove the creation of the alternative dispute resolution ("ADR") industry. However, conventional ADR, although sometimes helpful, is still costly and the results are often unacceptable.

An untold number of pending claims are ripe for settlement, but have not been resolved for reasons that have nothing to do with their merits. The present invention is based on the premise that the parties are best suited to settle those disputes but need a system that creates the opportunity for parties to successfully settle their claims easily, effectively, and inexpensively.

SUMMARY OF THE INVENTION

The present invention satisfies an existing need through an automated dispute resolution administration method. One embodiment involves checking an authorization for a request for access to an automated dispute resolution system made using a sponsor login area. A letter is automatically generated to a party to a dispute in response to a sponsor entering a case into an automated dispute resolution system. A person, adverse to the sponsor with respect to the case, is authorized to access the automated dispute resolution system. Tracking information is written onto a hard drive associated with at least one of the party or the sponsor; and a report is generated identifying open cases for the sponsor.

The above and description herein will render apparent advantages and features which address the existing needs. However, those advantages and features are only for representative embodiments, and are presented only to assist in understanding the invention. It should be understood that they are not to be considered limitations on the invention as defined by the claims, or limitations on equivalents to the claims. Some advantages are mutually contradictory, in that they can not be simultaneously present in a single embodiment. Similarly, some advantages are applicable to one aspect of the invention, less applicable to others, or wholly inapplicable to still others. Thus, the features and advantages should not be considered dispositive in determining equivalence.

BRIEF DESCRIPTION OF THE DRAWINGS

The following detailed description may best be understood by reference to the following description in conjunction with the accompanying drawings in which.

DETAILED DESCRIPTION OF THE INVENTION

Figure 1:
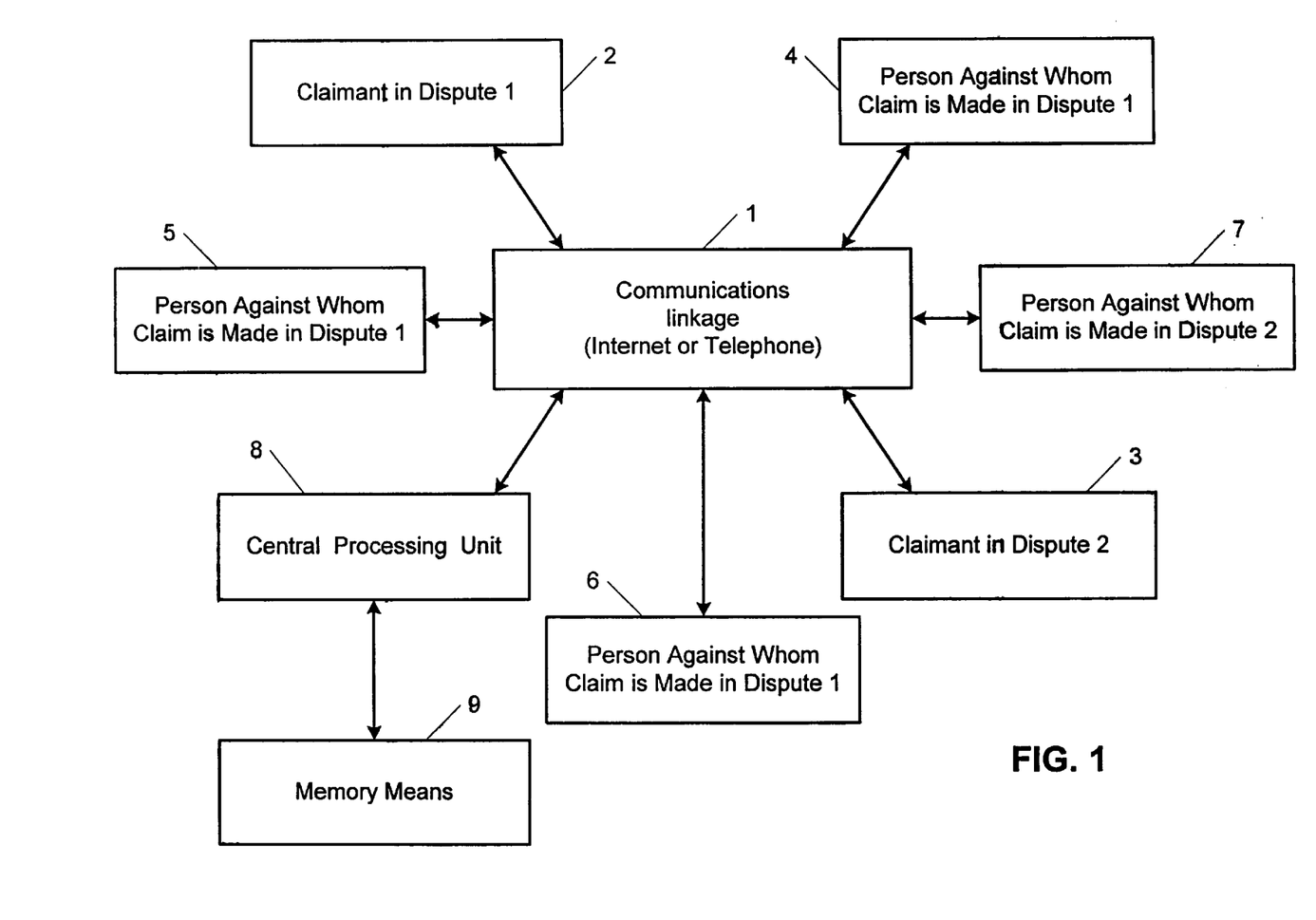
FIG. 1 is an overview of the computerized system of the present invention.

The present invention is a computerized system for automated dispute resolution through an Intranet website via the Internet or other communications linkage 1 for communicating and processing a series of demands to satisfy a claim made by or on behalf of a person involved in a dispute with at least one other person and a series of offers to settle the claim.

A demand is the amount of money required by the person having a claim 2, 3 against another person 4, 5, 6, 7, such as a defendant or his or her insurer, for which the person with the claim would be willing to settle. Information corresponding to the amount of the demand will be entered by the claimant or his or her representative by using the numbers of a touch-tone or cellular telephone or by typing the numbers on the keyboard of a personal computer. An offer is the amount of money the defendant or the insurance company will settle the claim.

The system communicates and processes the demands to satisfy and the offers to settle the claim through at least one central processing unit and includes operating system software for controlling the central processing unit 8, means for introducing information into the central processing unit 8 corresponding to the identification of the dispute and the persons involved in the dispute, and memory means 9 for storing the identification of the dispute and the persons involved in the dispute.

Preferably, the computer is secure, for example by the implementation of a "firewall" or protective barrier against unauthorized traffic or the use of encryption technology, and each case is preferably triple-password protected to assure privacy and prevent unauthorized access. For example, the system may require the user to enter a password or user identification number or alphanumeric combination and a user authorization code providing access control to the system. For increased security, systems may be designed which require user authentication, for example through the use of voice pattern, fingerprints, physical signature, or "smart" card.

No strategies, evaluations, or other work product are directly or indirectly disclosed to anyone, including the adverse party. Settlement offers and claimants demands that do not result in a settlement are never revealed to anyone. FIG. 1 shows the system of this invention using the Internet or a telephone as the communications linkage.

A person involved in a dispute is anyone or any company who has a claim against another person or against whom another person has asserted a claim, whether litigation is pending or not. The system includes:

means for introducing by or on behalf of a first person involved in the dispute against whom a claim is made information into the central processing unit corresponding to a series of rounds of offers to settle a claim without disclosure of the offers to other persons involved in the dispute, means for introducing by or on behalf of a second person involved in the dispute information into the central processing unit corresponding to a series of rounds of demands to satisfy the claim without disclosure of the demands to other persons involved in the dispute, comparison means for comparing the information corresponding to the series of demands and the series of offers on a round-by-round basis in accordance with preestablished conditions, means for permanently deleting the demand and the offer in each round that does not result in a settlement upon comparison of the demand and the offer in that round based upon those preestablished conditions, and means for communicating to the first and second persons or their representatives the results of the comparison.

Preferably, there will be three offers for each claim. Each demand will be compared with the offer of the same number (i.e. Demand #1 to Offer #1, Demand #2 to Offer #2, etc.). The computer matches the settlement offer against the claimant's demand and performs its programmed calculations in order to determine whether or not a settlement has been achieved. Where the demand and offer intersect in accordance with preestablished conditions, settlement is reached. In the case that the demand is less than or equal to the offer, then the case is settled at a settlement amount equal to the demand. In the case that the demand exceeds the offer, the system will preferably split the difference if the offer is within a preestablished percentage, for example 70% of the demand (i.e. demand x0.70<=offer). In such case, the settlement amount is the demand plus the offer divided by two. If 70% of the demand is still greater than the offer; there is no settlement unless the difference between the demand and offer is less than a preestablished amount, for example $5,000, in which case the claim is settled for the median amount between the demand and the offer.

Figure 2:
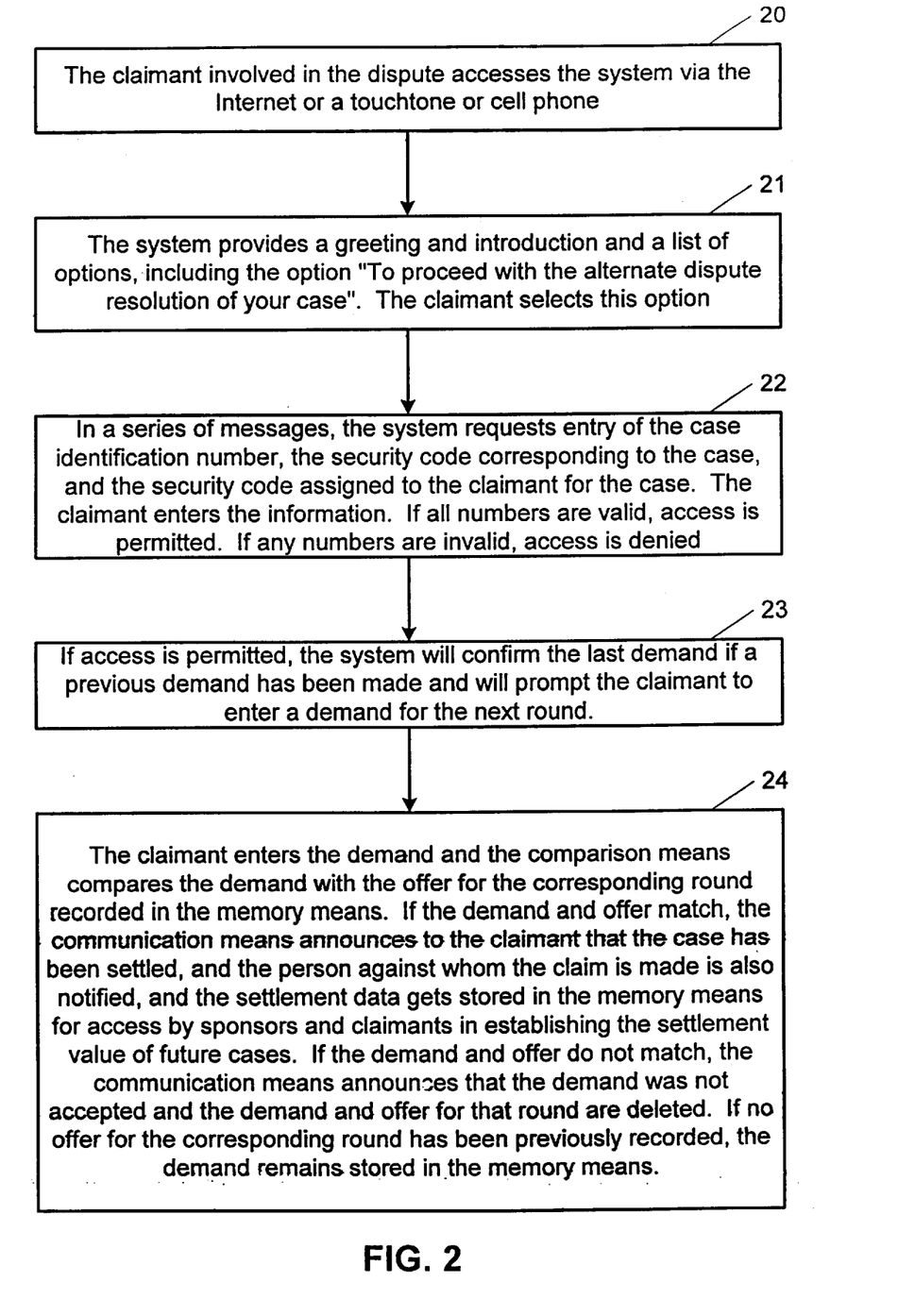
FIG. 2 is a block diagram showing how a claimant involved in a dispute interacts with the computerized system of this invention.

Thus, the parties communicate only with the computer, avoiding direct communication with each other. Wasteful personality conflicts fruitless and unnecessary disagreements, posturing and positioning cannot occur, so the parties deal exclusively with the "bottom line". FIG. 2 shows how a claimant involved in a dispute would use the confidential and automated system of this invention without direct communication with the other side.

The system preferably also comprises security means whereby the system is accessible only upon entry of a case identification number identifying the dispute, and a user security code corresponding to the dispute and identifying the person or representative thereof who is making the demand or offer.

Preferably, the system comprises means for generating voice messages to a person communicating with the system through a touch tone or a cellular phone linkage which guides the person in the use of the system. Alternatively, written messages may be used as prompts when the system is accessed from a personal computer via the Internet.

The entry of claims and settlement offers may also be expedited by a trained staff of computer professionals. For example, the website or telephone linkage can provide a series of options, one of which places the user into on-line or telephone communication with a customer service representative to answer questions or provide other assistance. Thereafter, the user may access the system by communicating to the processing unit via the Internet or by telephone, e.g. a toll-free number, at any time or day of the week to enter claims or settlement offers.

Preferably, the system comprises time keeping means to record the introduction of the information corresponding to the demands or offers over a period of time. In this way, introduction of information corresponding to demands or offers may be made in a plurality of communications with the system over a period of time. The system can handle multiple telephone calls or other communications from anywhere in the world.

The computer performs its functions and the result are reported to the parties as they occur in real time without waiting.

The system also encourages and enables plaintiffs to take a realistic approach to settlement with no risk of appearing irresolute or hesitant since a claimant's financial demands that do not result in a settlement are never disclosed. Preferably, claimants have only three or some other previously agreed-upon number of opportunities or rounds to settle claims using the system, and preferably settlement offers or rounds have only a limited period or "shelf life" in which they are operable, for example thirty days for all rounds, which encourages prompt action by claimants.

The system preferably also collects and processes settlement data generated from a settlement reached through the operation of the system for dissemination and use by users, for example sponsors and claimants, in establishing the settlement value of future cases. Means may be provided for a user to access actual settlements achieved through the use of the system in other disputes, for example, through a menu or voice choice provided to the user via telephone or the Internet whose selection provides the user with information about prior settlements. The data may be tabulated in the memory means so as to be accessible by certain categories, for example by court, by sponsor, by geographic location, or by other category. In this way, a user of the system can be guided in making demands and offers by actual settlements reached in similar cases.

The invention can be understood readily from the following description of a preferred embodiment in conjunction with the overview of FIG. 1. The present invention provides an online system, preferably Intranet website via the Internet or telephone accessible or both, to facilitate the settlement of claims by allowing attorneys and claims adjusters to use a simple interface to rapidly post a series of monetary claims against a case being tested against an algorithm for possible settlement. Preferably, the system also calculates, stores and tabulates settlement data once a settlement has been reached for reference by other users.

A person involved in a dispute against whom a claim has been made, such as a defendant or an insurer or other sponsor, preferably submits claims to the computerized system using electronic media and formats agreed upon by the parties. The sponsors preferably can also describe the algorithm amount and percentage to calculate claims and at the individual claim level check their exposure for a series of claims with a built-in calculator provided by a computer program in the system. Attorneys for a claimant can make demands in return and calculate their potential settlement gain. Claimant attorneys may be invited to participate in the process by an automatically generated letter that is sent out once the sponsor enters the case. The attorneys may then log into the system by special authorization codes.

The parties involved may agree in advance to the algorithm amount and the percentage, or a first person involved in a dispute may enter this data which is then agreed to by the second person.

In an Internet-based embodiment of the present invention, an Internet website is set up to provide the interface between system and user. Preferably, the major areas of the website include a login area for sponsors or their representatives, a login area for claimants or attorneys for claimants, and a login area for administration personnel who oversee the system. If desired, the website may also include a publicly accessible area that highlights information about the system. For increased security, a separate website may be set up with this information.

Individuals using the computerized system preferably must log into the system before they can manipulate any data. Preferably, they can view, enter and change only that information that is within their access limits—as an attorney for claimant, a sponsor user, a sponsor administrator, or a system administrator. A sponsor user is a claims adjuster or other agent who works for a sponsor, for example an insurance company or large self-insured organization, which has entered into an agreement to use the computerized system. A sponsor user is preferably limited to entering and reviewing cases relevant to their own entered cases, not cases entered by other sponsor users of the same sponsor.

Thus, a sponsor user preferably may enter the website to login to the system, for example by using a user name and password combination or pair, read and agree to an agreement for the sponsor's participation in the system, assign new cases for claimant attorney participation, and review any completed, pending or in-process cases that have been entered into the system by that sponsor user.

A sponsor administrator is a sponsor user who has been granted administrator privileges by the sponsor. Preferably, in addition to performing all the tasks that a regular sponsor user may perform, a sponsor administrator may enter the website to change sponsor contact information, change sponsor user login and contact information, add or delete sponsor users, create sponsor users with administrator privileges, and review cases for all sponsor users within the sponsor.

Claimants or their attorneys may enter the website to login to the system preferably using a username and password pair, read and agree to a system participation agreement for the claimant, review case information as prepared by the sponsor, with current case status information, and post claims against a particular case.

Preferably, system administrators who work for a company administering the system assist in the implementation of the system. System administrators with proper authorization, for example username/password combination identifying them as such, may enter the website to review, modify, delete and create sponsors, sponsor users, and sponsor administrators, and review, modify and delete and create cases or claims to be processed by the system. Preferably, a case report writer may be provided containing current case status information searchable by date, sponsor, sponsor user, case name and status, which is able to be accessed or queried by the system administrator. A more limited form of case report writer may also be provided to claimants and other users of the system in which only information that is within the user's access limit may be searched.

The system of the present invention is preferably designed to make it easy for a claimant attorney with any common Internet or telephone access to settle legal disputes that involve a monetary settlement.

In using the system, the sponsor accesses the system, for example, with a login to the website. The sponsor may at that time enter any pertinent case information about the case and the claimant attorney. After adding or reviewing case details, the sponsor submits all at once or over time a number of settlement offers, preferably up to three, for each claim submitted. Each settlement offer is identified by Round. For example, a sponsor may enter $40,000 as the offer for the first round (Round 1), $60,000 for the second round (Round 2), and $80,000 for the third round (Round 3).

If desired, in website based systems, an online calculator may be used to notify the sponsor user at that time as to what the sponsor's highest potential exposure might be. For example, if the preestablished conditions are such that the case will settle at the midpoint between the demand and offer if the offer is at least 70% of the demand or within $5,000 of the demand, whichever is greater, a sponsor user who enters $70,000 as the offer for a round may calculate that the possible exposure is $85,000 (corresponding to a $100,000 demand, i.e. the highest demand that will trigger a settlement under these conditions).

Once the claim is entered on the system, the claimant's attorney is contacted, for example by ordinary or electronic mail. (For simplicity, the claimant's attorney will be used but the discussion applies equally to the claimant and to other representatives of the claimant). The claimant's attorney chooses an attorney security code, which is preferably a unique numeric personal identification number ("pin number") that permits the attorney to access the computerized system. The claimant's attorney must also agree to be bound by any settlement achieved by the parties using the computerized system and may also at this time agree to the percentage within which a demand and offer in a round must be for settlement to occur, the formula for determining the amount of the settlement, the amount which may be zero in which the case nonetheless will settle if the difference in the demand and offer in a given round is less than or equal to that amount, and the formula for determining the amount of the settlement in that instance. The claim is now ready for settlement, and the claimant's attorney will preferably have three Rounds, or opportunities, to settle a claim, which may be entered over time or all at once.

Referring now to the block diagram of FIG. 2, the claimant attorney or other user (for example a defendant or sponsor) accesses the system via the Internet using any standard web browser or via an ordinary touch-tone or cellular telephone (step 20). No special equipment or training is needed by the attorney to use the system. The system "prompts" the attorney at each step of the process and provides automated, on-demand help if needed.

Figure 3:
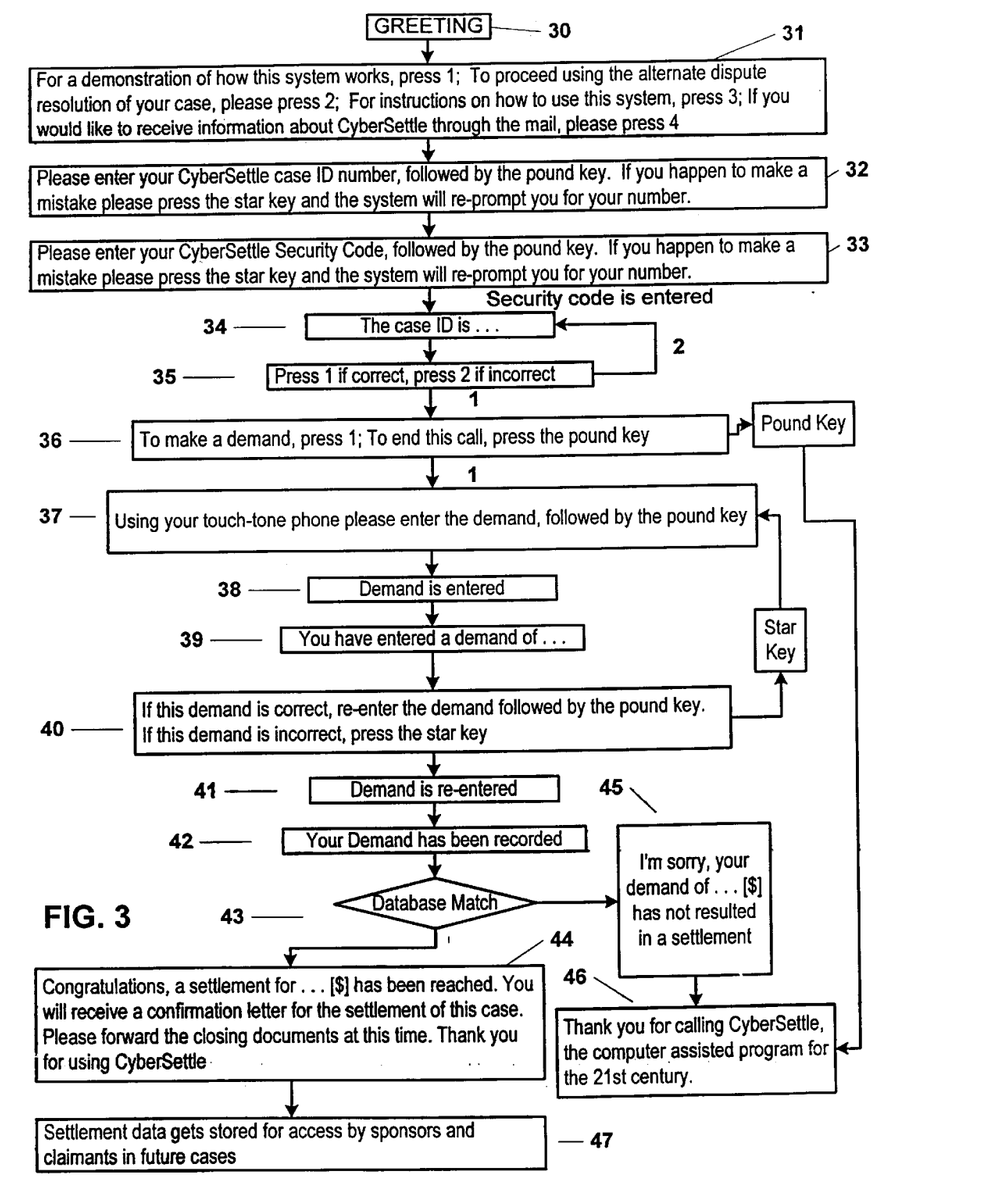
FIG. 3 is a block diagram of an example of how an embodiment of the computerized system of this invention prompts a person involved in a dispute in the use of the system.

For example, referring to the block diagrams FIG. 2 and FIG. 3, upon accessing the system, the user is met with a greeting (step 20) followed by a number of options (step 21) that may be selected by pressing the appropriate number of a touch-tone or cellular telephone (step 31).

In steps 32–35, the attorney's pin number and preferably two numeric "passwords" are required to commence the alternate dispute resolution of a claim. The system preferably generates a voice confirmation of the information which the user may confirm or cancel and reenter the information (see step 34). The system may, upon confirmation of the information, determine the correctness of the information and the user's authorization to access the system for that case. After entry and confirmation of the required numbers (step 22), the attorney follows the prompts and enters demands (step 23) using the telephone keypad or by typing in the demand at his or her personal computer. The system may also request confirmation of information entered by the attorney. See FIG. 3 for telephone-based embodiments.

The computerized system is designed to adhere to the will of the parties and makes no attempt to "force" a settlement.

No information concerning the facts, the law, or the injuries pertaining to the claim is preferably received by the system. The case can be settled only at a figure agreeable to the parties, not at some figure arbitrarily set by an interviewing third party. Thus, the parties can resolve disputes fairly using the system without relinquishing settlement authority.

Rounds may preferably be completed in one, two or three calls or computer sessions within a given time period, preferably thirty days. Once entered, the system instantly compares each demand to the settlement offer for each Round. If the demand and offer match or are within some preestablished range, the case is settled. For example, if the offer is within twenty percent of the demand, the claim is settled in accordance with a preestablished formula, for example the claim is settled for the median amount. If the offer and demand differ by more than twenty percent in all three Rounds, the case will not settle. If the settlement offer is the same as or greater than the claimant's demand, the claim is settled for the demand amount.

Preferably, the preestablished conditions are such that even if the offer and demand differ by more than a preestablished percentage in all three rounds, the claim will nonetheless settle if the offer and demand are within a preestablished amount, for example $5,000, in which case the claim will settle in accordance with a second preestablished formula, which may again be the median amount.

Two examples of a series of rounds and the results are given in Table 1. In these examples, the first preestablished formula is the median amount between the offer and the demand. In example 2, the preestablished amount is $5,000 and the second preestablished formula is the same as the first preestablished formula, i.e. demand plus offer divided by two equals the settlement amount.

TABLE 1

| Round | Claimant's Demand | Settlement Offer | Result |
|---|---|---|---|
| EXAMPLE 1 (preestablished percentage: 80% of demand) | | | |
| 1 | $200,000 | $40,000 | No settlement |
| 2 | $150,000 | $60,000 | No settlement |
| 3 | $100,000 | $80,000 | Settled for $90,000 |
| EXAMPLE 2 (preestablished percentage: 70% of demand) | | | |
| 1 | $19,000 | $4,500 | No settlement |
| 2 | $14,000 | $6,500 | No settlement |
| 3 | $12,000 | $8,000 | Settled for $10,000 |

Preferably, the system promptly notifies the parties of a settlement, for example while the user is online or via email to offline parties or by telephone, and follows that notice with a written confirmation. Unaccepted offers and demands expire without further action by any party, preferably after thirty (30) days.

The processing of the case data within the present invention begins when a person involved in a dispute, preferably a party representing a person against whom a claim or series of claims is made, for example a sponsor, enters into the central processing unit a series of rounds of offers to settle the dispute (or if the claimant, a series of rounds of demands to satisfy the claim)(step 24). The information as to each claim is submitted electronically in a format compatible with the system, for example via phone input or PC input fed to the central processing unit.

Another person involved in the dispute, for example, a party representing a person asserting a claim enters into the central processing unit a series of rounds of demands to satisfy the claim. The demands and offers are entered without disclosure to other persons involved in the dispute. The series of demands and the series of offers are compared on a round-by-round basis in accordance with preestablished conditions. For example, the parties may agree to be legally bound to settle the case if the demand and the offer in any given round are identical (in which case the claim is settled for that amount) or are within a previously agreed-upon range or formula, for example, within 20% or $5,000 or some combination (in which case the claim is settled in accordance with a previously agreed-upon formula, for example at the midpoint between the demand and the offer). Otherwise, the comparison means goes on to the next round and the previous round that did not result in a settlement is deleted permanently. After each round the system communicates to the parties the result of the comparison, i.e. no settlement or settled at a certain amount.

The computerized alternate dispute resolution method of the present invention may be implemented in Internet-based embodiments using a computer program representing a distributed database application written in a Mark-up Language such as ColdFusion Markup Language and Hypertext Markup Language (HTML). The system preferably is distributed through ColdFusion Server extensions which allow for interactive processing and Microsoft's SQLserver to allow attorneys and claims adjusters to access it via a standard web browser such as versions 3.0 and up of Microsoft Internet Explorer and Netscape Navigator, which can be found on a variety of platforms, including Microsoft Windows, Macintosh, and UNIX operating systems.

Information which is entered is submitted to a central database via the Internet. The database preferably indexes sponsors, sponsor users and administrators associated with that sponsor, and cases associated with that sponsor. It also preferably indexes attorneys associated with cases.

Preferably, if a period of time passes without activity when a user is online, for example 20 minutes under normal network traffic conditions, the user is automatically logged out for security precautions. For all or a portion of the data, the system may be designed so that once data has been entered, a sponsor or other user has a period of time, for example 30 minutes, after which the data cannot be withdrawn.

Figure 4:
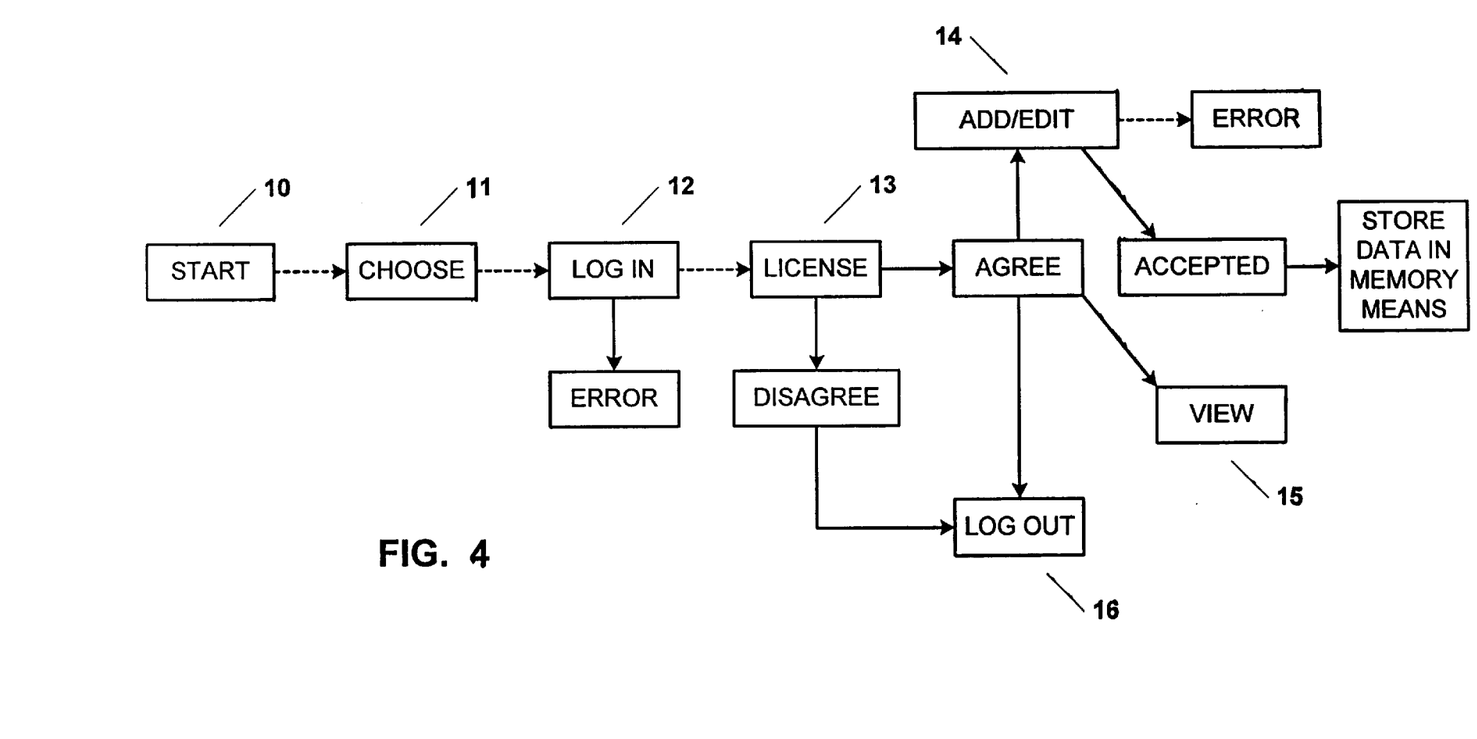
FIG. 4 is a diagram showing the program flow from a user perspective in accordance with a preferred method for operating the system of the present invention via the Internet.

Referring now to the flow chart of FIG. 4, the preferred computer program implementing the system enters at step 10 when a sponsor user opens their web browser (for example Netscape or Microsoft Internet Explorer 3.x or 4.x) and accesses the system website. The user is prompted by a menu with a series of options, one of which is "enter as Sponsor" which is chosen. If desired, the system may automatically write information in the form of ASCII text or "cookies" onto the user's hard drive as a means of keeping track of the user and the user's use of the system. Preferably, the memory means stores this information. Upon access to the system by the user, any preexisting cookies of the user may be modified to reflect the current access of the system by the user. Unless the user has explicitly denied cookies on his or her browser, the computerized system checks for the user's name through a variable saved in the user's browser. If the user has logged in before, the user is greeted by username, provided the user is logging in with the same computer.

In step 11, the sponsor user is presented with the choice of adding/editing cases, viewing all cases for that sponsor, or logout. As mentioned previously, preferably all or a portion of the data in the system may not be withdrawn after a period of time in which event the user will no longer be permitted to modify that information. Preferably a menu is provided in which the user may choose one of two links to separate functions. For example, a menu bar may be provided on the left hand side of the screen in which the user chooses by clicking on the appropriate box in the menu bar corresponding to the function. The user's choice is saved through intermediate login and contract screens which follow. Alternatively, step 11 may be implemented following login (step 12) discussed below.

The program next moves to step 12 in which the user must first log into the system before editing or viewing cases. The user must enter a username (unique to the entire database) and a corresponding password. If these do not match the pairs known by the system, the user is shown an error screen with the option to try again.

Alternately, if the user has logged in before with the same computer, his or her username may already be entered into the system, and the server which distributes the web pages checks the user's password against the username. If desired, the system may be designed so that the user has the option to enter a new or different username to allow multiple users to access the system from the same computer.

Computer program modules preferably are written to implement the various steps of the process. For example, a module controlling the sponsor user identity process may be created to hold all variables related to a sponsor user's identity and to cases of that sponsor.

A "Validate New User Name" module may be created which is called when the user places an entry in the user name field and leaves the field form. Preferably, the user name entry form has a JavaScript object which checks to see if the username has already been taken, and if so, displays an error message.

Step 13 shows the user a system participation agreement if the correct name and password were entered. The agreement preferably details the terms of use of the system and details regarding the process. Preferably, a button is provided on the menu for either agreement or disagreement with the contract. If the user agrees to the terms of the contract, he or she proceeds to the original menu choice (adding/editing cases, or viewing cases). Otherwise, the user is returned to the login screen with all information cleared.

If the user agrees to the participation agreement, the system may send the user to the original menu choice in step 11. Alternatively, the system may be designed to sent the user to a menu with the options of assigning a new case, reviewing cases, adding/editing cases or logging out.

If the adding/editing cases choice was originally chosen, the program enters step 14 where an Add/Edit case screen preferably allows the sponsor to enter the following information into the database:

Claimant name

Case Description

Sponsor Case ID

Dollar values for each of 3 settlement rounds The claimant Attorney name, firm, address, city, state, zip code, telephone, fax, and email.

In telephone-based embodiments, some or all of this information may be entered with the assistance of system administrators.

The Sponsor case ID is preferably a value for sponsor internal tracking selected by the sponsor.

The dollar value inputs need not all be entered at one time. The system will prompt the user to enter an amount for each round individually with the option to leave the amount in any given round blank for entry at a later time.

The dollar value inputs preferably include calculator functions which calculate the total possible exposure for the amount entered. The screen also may display the status of the case. Upon submitting the information, the user may be returned a confirmation screen with all entered information upon which the user can choose to accept the changes or return to edit the case further. Preferably, the system provides the user with a period of time, for example, thirty minutes, to edit some or all of the case information before that information becomes final. For that information made final, after the period of time has expired, further edits may be done preferably only with the agreement of all the parties.

Preferably, the Add/Edit screen includes a "submit" button at the bottom, which sends the information to be checked for formatting. It points out missing or improperly formatted text, or returns the text for verification. If the text is accepted, the data is sent to the database for entry as an addition or update. Preferably, a sponsor user cannot edit a case in which the claimant attorney has started to submit demands into the system, except to change clerical information such as address and phone number.

A Case Data Entry module may be created to hold a template that processes the sponsor user's entry of case data and add/insert it into the database. The main features of the program are the checking of an expired edit time, and whether or not the claimant attorney has entered a demand in the system. In either event, the form aborts and an error message is presented.

Preferably the program is written so that when a record is to be inserted, the insertion is held up and locked using a suitable program until the system can read the record in order for the details to be displayed back to the user within the screen for confirmation and in order that the system can provide a HREF to its primary key which is automatically assigned by the database.

Another module called "Sponsor Assigns Case" preferably drives the sponsor user's entry of a case into the database.

The Add/Edit calculator may be any suitable computer program, such as a JavaScript program, which applies the algorithm amounts specified by the sponsor to determine the maximum possible exposure.

If the original choice was viewing all cases, the program moves to step 15 where the View cases screen reveals all the information for a given case which has previously been entered during an Add/Edit choice. The user is also preferably given an option to edit the information, preferably with a specified time limit (e.g. 30 minutes) for the rounds of offers provided a claimant attorney has not started to submit demands. The View screen may, if desired, also display a list of cases that have been assigned to a sponsor user.

Preferably, a module called "Sponsor User Show" contains a template which shows the user these records. If the sponsor user has administrator privileges, the module shows all user records related to the sponsor. A similar module called "SponsorShowCases" preferably functions to show case information.

In step 16, the user may log out of the system from a menu choice to end the session and return the user to the login screen. This menu choice preferably also follows completion of the Add/Edit and View choices of steps 14 and 15. If a user attempts to engage the system again, he or she will have to login their user name/password pair. Preferably, logging out clears the password, but not the user name, so that upon subsequent login the computerized system may check for the user's name in the user's cookie if the user accesses the system with the same computer.

The screens appearing in the operation of the system may be created by suitable computer programs written in a Standard Generalized Mark-up Language such as Cold Fusion Script.

The computer program code for the Login screen creates the login form if a user is determined not to be in a logged in state. (FIG. 4, step 12). This form preferably passes on a variable value indicating the user's eventual destination.

The module for the License screen follows the Login program and checks the user's authentication credentials. if the user passes, the License screen is shown (FIG. 4, step 13).

Preferably, a module called Login results follows the License module and sets the user state to logged in. Unless the user has explicitly denied cookies on his or her browser, the program also checks to see if the user's cookie has taken correctly and sends an error message if it does not. If all is correct, the module sends the user on to his or her selected destination.

A Logout module may be used to log a user out of the system. Preferably the next time the user tries to use a menu item, he or she will be prompted for a password and to approve the license agreement.

If the user disagrees with the license, a module following the License module displays the Disagree screen which preferably indicates that the user must agree to the license in order to use the system.

An Access Denied screen may be created to show a user who attempts to access a section he or she does not have authorization for.

A Default page for debugging purposes may also be used to show current user login status. Preferably, this page is for a system administrator, and other users would normally not be able to access this page without mentioning it explicitly.

The above-described steps preferably apply equally to sponsor administrators (sponsor users designated with administrator privileges by the sponsor). However, the system preferably may be designed so that if the user is identified as holding administrator privileges, he or she will see an enhanced version of the sponsor user menu. In addition to providing the user with the option to assign a new case, review cases, and logout, the sponsor administrator menu provides the options to change sponsor information, change his or her own user information, add a user, show/edit users, and remove a user.

If the change sponsor information option is selected, the program sends the user to change the sponsor information screen which allows the user to add/edit sponsor information stored in the database, including Sponsor Name Address City State Zip Code Phone Fax Email If the remove a user option is selected, the program sends the user to user information screens which the sponsor user administrator can use to change, delete, or add information to any sponsor user's record to which they have access for their sponsor.

For example, the user information screen may allow the user to add/edit the following information into the database:

User Name

Sponsor Name

Address

City

State

Zip Code

Telephone

Fax

Email

Username

Password

Active User (yes or no)

Administrator User (yes or no)

Computer modules preferably contain the screen forms for entering and editing sponsor user and new sponsor user information. These modules also may screen users for administrator privileges, for example, before allowing the user to edit records.

Many of the above-described steps preferably also apply to a claimant attorney, i.e. an attorney that represents an individual or company that has dispute or has initiated a lawsuit with a sponsor who has entered into a participation agreement to use the system.

The attorney may be notified, for example, by regular mail, that he or she can login to the website and submit a specified number, for example three, of demands to satisfy a claim according to preestablished conditions. The attorney may be required to sign a participation agreement, preferably mailed to him or her, before given the proper login credentials. Once the attorney signs and forwards the agreement to the system administrators, the attorney is given the proper login credentials.

As in the case of sponsor users, the claimant attorney opens his or her web browser and accesses the system website (See FIG. 4, step 10). The attorney, however, chooses an "enter as Attorney" option provided on the menu that appears.

In step 11, the attorney is presented with the choice of reviewing cases placing demands on cases assigned to the attorney. Preferably a menu is provided in which the user may choose one of three links to separate functions via a menu bar on the left-hand side of the screen. As in the case of the sponsor user, the claimant attorney's choice is saved through intermediate login and contract screens which follow.

The program next moves to step 12 in which the user must first log into the system before making demands or viewing cases. A "Login" computer file for an attorney similar to the "Login" file for the sponsor preferably implements this step. Preferably, the user must enter a case identification number, a security code, for example, an internally generated random number which functions as a password), and an attorney security code (preferably, a code generated by the sponsor). If these do not match the information known by the database, the user is shown an error screen with the option to try again.

As in the case with the sponsor user, step 13 shows the claimant attorney a system participation agreement if the correct name and password were entered with the same options and results discussed previously. A "License" file similar to the "License" file for the sponsor user preferably implements this step.

If the user agrees to the terms of the agreement, he or she proceeds to the original menu choice (reviewing cases or making demands). Alternately, the system may be designed to send the user to a main menu with the options of obtaining case information, placing a demand for the next round of the particular claim or settling a different case. A "Login-Results" file and a "Disagree" file similar to corresponding files for the sponsor user follow the "License" file to implement this step depending on whether the claimant attorney agrees or disagrees. Similarly, "Logout", "Access-Denied", and "Default" files corresponding to similar files for sponsor users preferably are provided.

If the case information option was selected, a case information screen is provided which preferably allows the claimant attorney to view the following information from the database:

Case Name

Status claimant Name

Attorney name

Attorney firm

Attorney address

Attorney city

Attorney state

Attorney zip

Attorney telephone

Attorney fax

Attorney email

Preferably, the screen displays the current status of the case with the corresponding details of the case without the ability of the attorney to edit any of this information. A module controlling the case status process may be written to hold all variables related to an attorney's cases. An "AttorneyCaseInfo" module may also be created which displays the information an attorney needs to start making demands against a case. Preferably, the data in the module may not be withdrawn.

If the next round with current case option was chosen, the program moves to a Next Round screen which provides the attorney with the option to place a demand against a particular claim. A "CaseNextRound" module may be created to form a template which determines what the next round is, if any, and places a bid form in front of the user. Preferably, the screen provides a form box in which the attorney places the demand, and if desired menu options to either test the demand against the exposure calculator (preferably implemented by a JavaScript program applying the algorithm amounts specified by the sponsor) to determine the lowest possible amount the case will settle for, or to submit the demand.

After the attorney submits the demand for the next round, the case is submitted to the database for operation by the comparison means. A "CaseNextRound" module may be created to form a template to determine the results of the comparison based on the information that the claimant submitted on the CaseNextRound form and on the preestablished conditions. Preferably, the preestablished conditions are determined on a sponsor by sponsor basis.

If the demand and the corresponding offer by the sponsor for that round are within the preestablished conditions, the user is preferably presented with a case acceptance screen. If the demand and the corresponding offer are not within the preestablished conditions, the user is preferably presented with a link to the next round screen, if a round is available, i.e. the previously agreed number of rounds of demands has not been used. If a round is unavailable, for example, the parties have agreed to three rounds and the claimant attorney has entered three rounds of demands, the user will see a message that the case is now closed in the system.

If the user is presented with the case acceptance screen, the claim is settled and the attorney is notified of the dollar amount of the settlement, and preferably the details of where to send the final settlement request (e.g., the sponsor's address). As shown in FIG. 4, the system preferably is designed so that upon settlement of the claim, data for the settlement is collected and stored in the memory means for access and use by sponsors and claimants in establishing the settlement value in future cases.

Preferably, the system is administrated by a system administrator who may be an employee of a third party who has been granted login rights to the administration function of the system for the purpose of adding sponsors, generating reports, or performing customer service on the website.

The system administrator reaches the website by opening his or her webbrowser, pointing it at the website interface and entering in appropriate identification numbers or passwords identifying him or her as an administrator. A module may be created which contains an administrator form for the assignment or editing of a case.

The administrator may then be presented with an administrator menu which provides the following menu choices:

Sponsor options, including the options to add/edit a sponsor and to show a list and links to all sponsors;

User options, including the options to show users (preferably a list and links to all sponsor users, searchable by user name and sponsor name), to add a new user, and to delete a sponsor user;

Case options, including the options to show cases preferably by a list and links to all cases, searchable by case name, sponsor name, start date, end date and status, to assign a new case, and to delete a case; and Site options (testing modules) including the options to clear cookies for the purpose of losing stored login information, to logout for the purpose of logging out the system and if desired to clear cookies, and to show login status for current login details.

Preferably, modules may be created to facilitate these options. For example, an "AdminNewSponsorUserEntryForm" module may be created which contains an entry form to enter a new sponsor user. Preferably, this form is different from the regular form because of the username checking that occurs during the user's interaction with the page.

An "AdminGetSponsorNewCase" module may be created which chooses a sponsor for the purpose of adding a new case. Preferably, the identity of the sponsor should be known when a case is added so that the case may be properly assigned to a sponsor user.

An "AdminShowCases" module may also be created which shows all open cases in an administrator form. An "AdminSponsorUserDataEntry" module may also be created to hold a template which inserts or updates a sponsor user. The module makes a query to obtain the primary identification of the user, if the system does not have this information, in order for the system to set an edit link.

An "AdminSponsorUserEntryForm" module may also be created to hold a template representing the entry form for sponsor user administrator information. An "AdminUserShow" module may also be created which contains an administrator form to show all users.

A "CaseDataEntry" module may also be created which contains a form to enter/insert cases into the database.

If the Add/Edit a Sponsor option is chosen, an Add/Edit a Sponsor screen preferably appears to allow the administrator to view/edit the following information from the database:

Sponsor name

Address

City

State

Zip Code

Phone

Fax

Mail

Algorithm amount

Algorithm percentage

System ID

Active Account (yes or no)

"SponsorDataEntry", "SponsorEntryForm", and "SponsorShow" modules may be created to add a new sponsor to the database and show a return page, to contain an entry form to enter a new sponsor, and to show a table of all sponsors entered into the system.

"ValidateNewUserName" and "ValidateUserName" modules may be created which check to see if a username exists in a sponsor table and if so, display an error message. Preferably, these modules are called from a JavaScript lost focus event. The ValidateNewUserName module preferably gives no consideration to the current username as it assumes that there is none.

The Delete User option provides the administrator with screens in which the administrator can change, delete or add information to any sponsor user's record as in the case with the sponsor administrator's remove a user option. Preferably, a "DeleteUser" module and a "RemoveUser" module may be created which show the form that allows a user to delete a sponsor user and perform the database call to remove a user.

The Add/Edit case option provides the administrator with an Add/Edit case screen similar to the sponsor administrator's Add/Edit Case screen. In addition, the system preferably allows the administrator to add case status information including:

Case Status

Last sponsor edit (date-time)

Edited by

Sponsor name

Last attorney edit (date-time)

Last administrator edit (date-time)

A "DeleteCase" module and a "RemoveCase" module may be created to show the form that allows the user to delete a case and to perform the database call to remove a case.

Preferably, the system also provides a report writer or searchable module of case information for reporting purposes. By querying the report writer, the status of any number of cases may be viewed by the administrator for the purposes of internal reporting.

Preferably, case information may be searched based on the following criteria:

Case Name

Sponsor name

Status

Assigned date (start and finish dates)

Modified criteria (start and finish dates, for example, all records modified in a particular day)

Show only records unmodified by an attorney

The selected platform and hardware to implement the system should be scalable enough to handle large loads of traffic and data, while being responsive to user requests.

Similarly, the database chosen should be scalable enough to handle a distributed data environment, and to be able to handle large loads of data, while being responsive to user requests.

The application server likewise should be scalable enough to handle a distributed data environment, and to be able to handle large loads of data, while being responsive to user requests. Preferably, the application server is a popular platform in which to build applications of this type in order to support future changes, add-ons, modifications, etc.

The server preferably is an open architecture computer that has the ability for failed hardware parts to be replaced swiftly. This configuration also maintains the availability to increase the power of the machine or demand. For example, a computer having an Internal Pentium 400 MHz Processor, with 128 MB SDRAM, two 4.2 Western Digital Hard Drives, a Promise PCI-RAID Level O Controller, a 32×CD-ROM, and 3-COM 10-BaseT Ethernet Card is suitable for use in the system.

The platform for use in the system preferably has the ability to work with open database systems, provide a reliable and scalable platform for intranet and line of business applications, and offer breed file and print services that give users easy and effective access to information and resources. For example, Microsoft Windows NT Server 4.0 system, a powerful multipurpose server operating system, is a suitable platform because of its broad support of many application servers, its scalabilty to support the system of the present invention and its popularity with developers who create applications of this type. The platform preferably integrates the following services into underlying operating system infradtucture:

Built-in networking and communication services

Comprehensive Web services for the Internet and corporate intranets

Complete platform form for distributed applications

Enterprise-wide directory services

Integrated and robust security services

Easy-to-use and flexible management services.

The system of the present invention preferably uses a webserver, such as Microsoft Internet Information Server 4.0, that offers proven scalability and tight integration with the operating system and other products used in the system. The web server preferably includes publishing features, customizable tools, and technologies that permit the creation of Web pages, the publication of information to the World Wide Web, the sharing of files and data on operating systems such as Windows NT, Novell NetWare and UNIX servers, and over numerous databases, including Microsoft SQL Server, Oracle, and Sybase databases, and the search capacity for content in HyperText Markup Language and Microsoft Office document types, and multiple languages.

Preferably, the webserver offers process isolation, a feature which protects applications and Web sites from failure caused by misbehaving components or Web-applications on the server by running them in separate memory spaces. The webserver should also have when combined with the operating system built-in distributed application services that automatically scale to serve thousands of simultaneous users.

Preferably, a high performance, open architecture, scalable database, such as Microsoft SQL Server 6.5, is used in the system.

The computer program is preferably one which provides a scalable platform to deliver high performance Web applications with any major Web server on Windows or Solaris. Allaire ColdFusion Application Server 3.1 and its cooperating ColdFusion Markup Language are suitable for use in developing the system.

Preferably, the system is hosted at a quality data center, such as a worldwide data center company which provides access to the Internet and monitors the servers to ensure that they are responding to Internet requests.

What we claim is:

1. An automated dispute resolution administration method comprising: checking authorization for access to an automated dispute resolution system made by a sponsor through a sponsor login area and automatically generating a letter to a claimant, adverse to the sponsor with respect to a dispute, in response to the sponsor entering a case into an automated dispute resolution system wherein the dispute resolution system uses rounds of offers by the sponsor and demands by the claimant wherein the sponsor settlement offers and the claimant demands are not disclosed to the claimant and the sponsor, respectively to settle disputes;

authorizing the claimant to securely access the automated dispute resolution system;

and writing tracking information onto a disk drive associated with at least one of the claimant or the sponsor.

2. The method of claim 1 further comprising:

generating a report for the sponsor identifying to the sponsor open cases submitted by the sponsor.

3. The method of claim 1, wherein the automated dispute resolution system includes multiple cases submitted by multiple sponsors, the method further comprising:

generating a report identifying at least some of the sponsors and cases submitted by each of the at least some sponsors.

4. The method of claim 1, further comprising:

adding a sponsor into the automated dispute resolution system.

5. The method of claim 1 further comprising:

assigning a sponsor entered new case for a dispute to a sponsor account.

* * * * *